US006935105B1

(12) United States Patent
Page et al.

(10) Patent No.: US 6,935,105 B1
(45) Date of Patent: Aug. 30, 2005

(54) INTEGRATED APPARATUS FOR REMOVING POLLUTANTS FROM A FLUID STREAM IN A LEAN-BURN ENVIRONMENT WITH HEAT RECOVERY

(75) Inventors: Dorrish L. Page, Camarillo, CA (US); Bradley L. Edgar, Oakland, CA (US); Robert J. MacDonald, Playa Del Rey, CA (US)

(73) Assignee: Ceryx Asset Recovery LLC, Encino, CA (US)

( * ) Notice: Subject to any disclaimer, the term of this patent is extended or adjusted under 35 U.S.C. 154(b) by 0 days.

(21) Appl. No.: 09/831,207

(22) PCT Filed: Nov. 4, 1999
(Under 37 CFR 1.47)

(86) PCT No.: PCT/US99/26050

§ 371 (c)(1),
(2), (4) Date: Feb. 6, 2002

(87) PCT Pub. No.: WO00/28196

PCT Pub. Date: May 18, 2000

Related U.S. Application Data (60) Provisional application No. 60/107,482, filed on Nov. 6, 1998.

(51) Int. Cl.$^7$ ............................................. F01N 3/00
(52) U.S. Cl. ............................ 60/298; 60/274; 60/299; 422/108; 422/204; 422/173

(58) Field of Search ........................... 60/274, 298, 299, 60/301, 311; 422/168, 170, 173, 108, 109, 422/202, 203, 204; 165/66, 164, 165, 176, 165/184

(56) References Cited

U.S. PATENT DOCUMENTS

| | | | | | |
|---|---|---|---|---|---|
| 5,143,700 A | * | 9/1992 | Anguil | ........................ | 422/176 |
| 5,326,537 A | * | 7/1994 | Cleary | ........................ | 422/173 |
| 5,335,492 A | * | 8/1994 | Zirkel | ........................ | 60/298 |
| 5,567,390 A | * | 10/1996 | Cleary | ........................ | 422/111 |
| 5,814,284 A | * | 9/1998 | Schluter | ........................ | 422/175 |

* cited by examiner

*Primary Examiner*—Thomas Denion
*Assistant Examiner*—Diem Tran
(74) *Attorney, Agent, or Firm*—SoCal IP Law Group LLP (57) ABSTRACT

An apparatus and method to treat fluid streams, and in particular emissions from lean-burn engines such as diesel engines, are disclosed, which use multiple catalysts chosen to remove hydrocarbons, carbon monoxide, particulate matter, and oxides of nitrogen. The apparatus and method also provide for heat exchange between the inlet and outlet exhaust streams to sustain the catalyzed reactions, by placing the catalysts in the temperature zones where their operation is enhanced, and they also allow for regeneration of a filter used to trap particulate matter in the streams.

45 Claims, 4 Drawing Sheets

FIG. 1

FIG. 2
Fluid Flow Path

FIG. 4

INTEGRATED APPARATUS FOR REMOVING POLLUTANTS FROM A FLUID STREAM IN A LEAN-BURN ENVIRONMENT WITH HEAT RECOVERY

This application claims the benefit of Provisional Application No. 60/107,482 filed Nov. 6, 1998.

BACKGROUND OF THE INVENTION

This invention relates generally to apparatus for treating the exhaust streams of lean-burn engines and, more particularly, to apparatus of this kind that catalytically oxidize hydrocarbons, particulate matter, and carbon monoxide, and that catalytically reduce nitrogen oxides.

Emissions Components

Lean-burn engines, such as diesel engines, emit various gases, including nitrogen oxides (NOx), gaseous hydrocarbons (HC), carbon monoxide (CO), and sulfur dioxide, $SO_2$, and also emit combined solids and liquids called particulate matter (PM). This PM is composed of dry carbon (i.e., soot), inorganic oxides (primarily as sulfates) and liquids (such as condensed hydrocarbons). The sulfates, which are formed during combustion by the oxidation of sulfur present in the diesel fuel, react with the moisture in the exhaust to form sulfur acid, $H_2SO_4$. The liquids are a combination of unburned fuel and lubricating oils called the soluble organic fraction (SOF).

Treatment Needs

Diesel emissions are more complex than those from gasoline engines, and their catalytic treatment is more complicated. Governmental efforts to reduce engine emissions are becoming stronger, with concerns over global warming, human health effects, and high fuel prices leading to renewed interest in lean-burn engines. Intense focus has been given, in particular, to the reduction of PM and NOx in lean-burn engines. Most approaches aimed at reducing one of these two pollutants have led to an increase in the other. This characteristic, known as the PM/NOx trade-off, has remained problematic to the diesel engine industry. Therefore, these engines continue to require exhaust after treatment to meet these tougher emissions standards.

Current Treatment

Current oxidation catalysts used to reduce HC, CO and the soluble organic fraction of PM are typically washcoat-deposited on the channel walls of a cordierite- or another ceramic-based substrate. These catalysts are usually platinum- or palladium-based, and can be supported by alumina, zirconia, and vanadia with various promoter oxides such as rare earths. Current catalyst technology can reduce the soluble organic fraction of the PM as well as CO and HC, but cannot reduce NOx. Traditional automotive three-way catalysts cannot reduce NOx in excess air, such as is present in a lean-burn environment. A system solution is one way to achieve this simultaneous reduction of HC, CO, PM, and NOx.

The oxidation of HC and CO over a catalyst in a lean-burn environment has not traditionally been difficult, provided the exhaust gases and catalyst are above the so-called "light-off" temperature. Oxidation catalysts are typically composed of platinum or palladium impregnated on a washcoat that is applied to a catalyst substrate. For NOx reduction, a catalyst that could decompose NOx to $N_2$ and $O_2$ would provide the ideal solution; however, such a catalyst has proven difficult to develop. Alternatively, a large number of catalyst formulations have been shown to promote NOx reduction in the presence of HC. Using these formulations, the NOx acts as an oxidizer to convert HC to carbon dioxide and water. In practice, the HC reducing agent comes either from unburned fuel leaving the engine cylinder, or from post-combustion injection of fuel into the cylinder, exhaust manifold, or exhaust duct upstream of any exhaust aftertreatment apparatus.

While oxidation catalysts are effective in oxidizing the SOF component of the PM, they are not effective in oxidizing solid carbon. An alternative approach is to filter, or trap, the PM with a diesel particulate filter (DPF). However, DPFs have not been in widespread use, principally because the collected PM builds up on the filter, eventually leading to high back-pressure, which leads to reduced power and fuel economy. Further, excessive back-pressure from a blocked filter can damage the engine. A number of approaches have been proposed to burn off the PM, or to regenerate the DPF. These include, but are not limited to, the use of burners, catalytic fuel additives, and catalyzed DPFs.

There remains a need for an effective apparatus for reduction of all major pollutant types in a lean-burn environment, which is integrated and convenient, and which incorporates a NOx reduction function along with a DPF, and a means to regenerate the DPF. The present invention fulfills this need and provides further related advantages.

SUMMARY OF THE INVENTION

The present invention resides in an integrated apparatus for effectively and conveniently oxidizing and reducing pollutants in a variety of lean-burn environments. These environments include various types of engines, such as diesel internal combustion, dual-fuel (diesel and natural gas), dedicated spark-ignited lean-burn, and homogenous charge compression ignition. The apparatus preferably is positioned downstream of the turbocharger in the exhaust duct of a lean-burn engine. The apparatus allows for treatment for particulate matter (PM), hydrocarbon (HC), carbon monoxide (CO) and nitrogen oxides (NOx) in one integrated system, and allows for recovery of heat from these reactions for preheat of the incoming exhaust stream to raise the internal catalyst temperature.

The apparatus makes use of a catalyzed diesel particulate filter (DPF), and also can include a lean-NOx catalyst (LNC), and/or a diesel oxidation catalyst (DOC), integrated together within a novel heat exchanger design. The heat exchanger is preferably in a spiral configuration, but can also be in other known configurations, such as shell-and-tube, plate-and-frame, rotating bed, or flow-switching.

The DPF provides catalytic treatment of HC, CO and PM. The DPF captures PM from the stream, and is regenerated to prevent pressure drop from collected PM on the filter becoming excessive. The DPF is preferably a wall flow particulate filter made of a ceramic material such as cordierite, silicon carbide, mullite, or a number of other high temperature porous ceramic substrates. Alternative configurations to the wall-flow filter geometry include small pore ceramic foams, sintered metal meshes, and ceramic fiber yarns. All provide large filtration areas with pore sizes small enough to provide a filtering function.

The DPF material also can be coated or impregnated with a catalytic material to lower the necessary temperature for regeneration. Catalytic materials include precious metals such as platinum or palladium, or non-precious metal compounds such as ceramic oxides (e.g., Mn—O).

The apparatus also can employ a LNC in the appropriate temperature regions of the heat exchanger for the reduction of oxides of nitrogen. The LNC reacts the NOx with HC, that either is present in the entering stream, or alternatively is provided by a fuel injector, as discussed below. The LNC can be placed adjacent to the DPF, or elsewhere upstream of the DPF. Alternatively, the LNC can be deposited on the upstream surfaces of the DPF. The LNC preferably has a monolithic structure, but also can be comprised of ceramic or metal foam. Suitable active metals include platinum, iron, tin, or copper. Washcoats can be either alumina- or zeolite-based. Also, high-surface-area alumina can function as a LNC with the addition of precious or base metals.

The apparatus also can employ a DOC in the appropriate temperature regions of the heat exchanger for oxidation of stream constituents. DOCs can use precious metals such as platinum, palladium, or gold, and they can be impregnated on alumina or zeolite washcoats.

The apparatus also can employ a fuel injector to inject HC into the stream at the inlet passage. This injected HC, when reacted over the LNC, DOC, or catalyzed DPF, can elevate the temperature at the DPF to improve the oxidation rate of the PM for regeneration. The apparatus also employs pressure, temperature and engine speed sensors, and also a controller to regulate the rate of HC injection to appropriate levels. Alternatively, an electric resistance heater can be used to heat the fluid stream in the inlet passage, if necessary. Further, the HC injection can be incorporated into a burner system to allow flame-based heating of the catalyst if the catalyst is below its light-off temperature.

The apparatus enables a modern engine to achieve the increasingly difficult standards for heavy-duty engines, without significant changes in fuel injection equipment, and without employing advanced exhaust gas recirculation. The compact size and excellent noise abatement qualities of the apparatus also allow it to replace the existing muffler or silencer for an engine.

Other features and advantages of the present invention should become apparent from the following detailed description of the invention, taken with the included figures and schematics, which illustrate the principles of the invention.

DETAILED DESCRIPTION OF THE PREFERRED EMBODIMENTS

Figure 1:
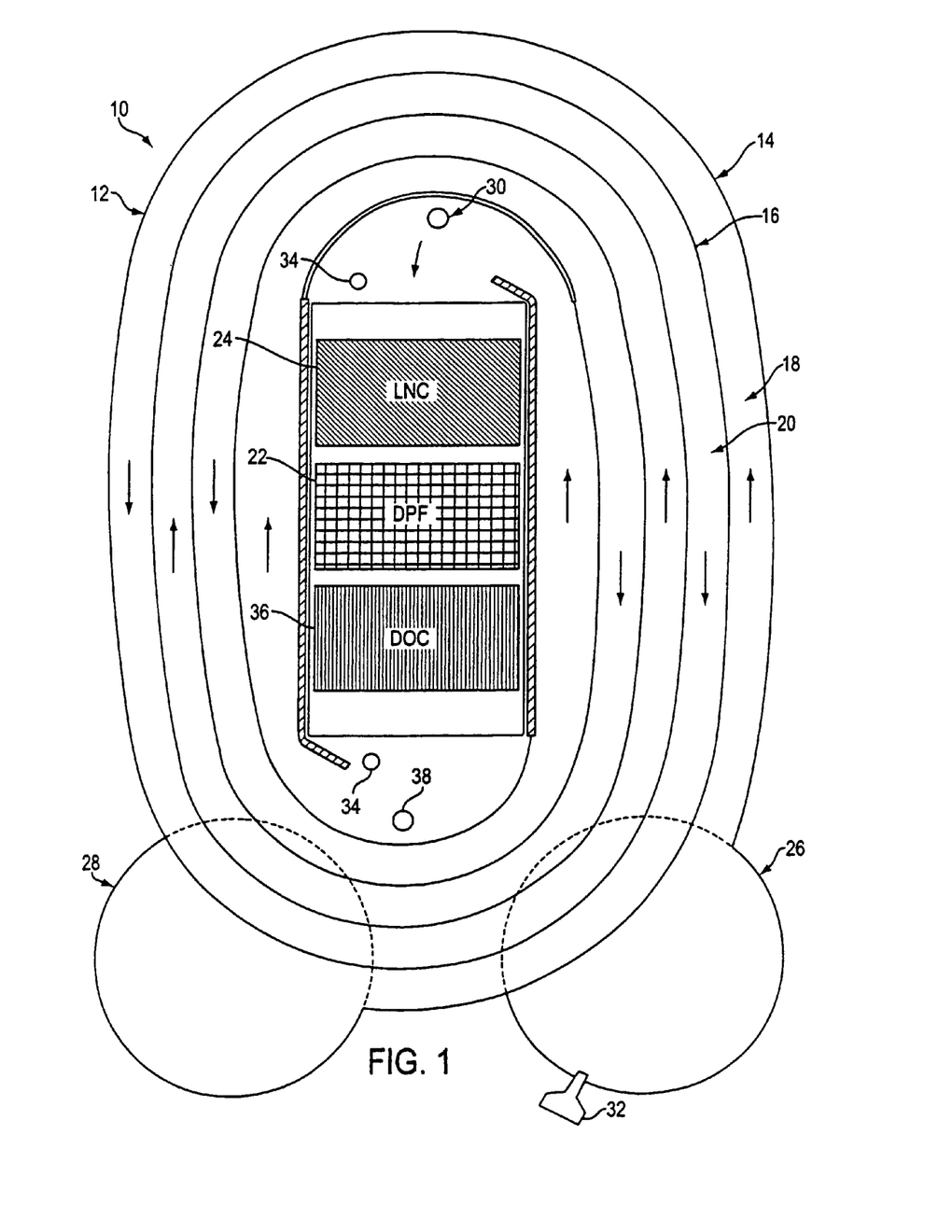
FIG. 1 is an end view of an embodiment of an apparatus in accordance with the invention for treating lean-burn emissions, with arrows indicating the direction of flow through spiral-shaped inlet and outlet flow passages, with a lean-NOx catalyst, diesel particulate filter, and diesel oxidation catalyst located at the interface between the passages. The embodiment also includes a fuel injector for hydrocarbon addition, as well as engine speed, pressure and temperature sensors used in optimizing operating performance.

With reference now to the illustrative drawings, and particularly to FIG. 1, there is shown an apparatus 10 for treating fluid streams, such as emissions from lean-burn engines, for hydrocarbon (HC), particulate matter (PM), carbon monoxide (CO) and nitrogen oxides (NOx) in an integrated system. The apparatus can be positioned downstream of a turbocharger in the exhaust duct of an engine or other emissions source.

The outer surface of the apparatus forms a heat exchanger shell 12. Within the shell are two exchanger walls 14 and 16 that form an inlet passage 18 and an outlet passage 20 for heat exchange between the entering and exiting fluid stream. The exchanger walls allow heat transfer across their surfaces, and can receive normal lean-burn exhaust flows without excess corrosion. The exchanger walls form a spiral structure, in which heat exchanges between the pre- and post-treatment streams in an inward spiral flow path and an outward spiral flow path. The exchanger walls are of thin gauge, between 0.018" and 0.040", and are made of muffler grade stainless steel to handle the medium exhaust temperature. Arrows shown in the passages in FIG. 1 indicate the direction of the flow of the fluid stream through the passages. Although a spiral configuration for the exchanger walls is a feature of the preferred embodiment, other known configurations for heat exchange, such as shell-and-tube, plate-and-frame, rotating bed, or flow switching, also are possible.

At the distal ends of the inlet passage 18 and outlet passage 20 are an inlet plenum 26 and an outlet plenum 28, through which the fluid stream enters and exits. The inlet and outlet plenums are configured and designed to produce negligible pressure drop.

A catalyzed diesel particulate filter (DPF) 22 is located in a region at the interface of the inlet passage 18 and outlet passage 20. In the DPF, the fluid stream contacts a filter for PM capture and a catalyst to oxidize PM, HC and CO. The DPF extends across the interface of the inlet and outlet passages, so that the fluid stream flowing from the inlet passage to the outlet passage must pass through the DPF. The DPF can employ platinum- or palladium-treated wall-flow filters as catalyst. The DPF is comprised of silicon carbide, cordierite, metal, or other similar filter material. Preferably, the DPF is a platinum-coated catalyst on a cordierite wall-flow particulate filter. The DPF also can be coated with a non-precious metal ceramic oxide. However, other configurations are possible, such as ceramic foams of small pore size, sintered metal foams, structures composed of ceramic fiber yarn, and any other materials that provide filtering properties.

A diesel oxidation catalyst (DOC) 36 is located adjacent to the DPF 22. The DOC is an oxidation catalyst comprised of either precious or non-precious metal on a washcoat, which coats a traditional catalyst substrate. The DOC preferably has a monolithic structure, but also can be comprised of ceramic or metal foam. Suitable oxidation catalyst materials include platinum, palladium, or any of a family of non-precious metal-based ceramic oxides, such as Mn—O. If the DPF contains sufficient catalyst to perform necessary oxidation, the DOC can be eliminated.

A lean-NOx catalyst (LNC) 24 is located upstream of the DPF 22 and DOC 36. The LNC alternatively can be located further upstream, in the inlet passage 18, depending on the preferred operating temperature of the LNC selected. The LNC uses HC as an agent for reducing NOx via the following global reaction:

$$HC+O_2+NOx \rightarrow H_2O+CO_2+N_2$$

The LNC must be placed such that sufficient HC is available in the stream for the lean-NOx reaction. This may require that the LNC be placed upstream of a DPF and/or DOC. The LNC preferably is based on alumina and configured to operate between 200° C. and 600° C., and therefore is placed accordingly in the correct temperature window of the inlet passage. The LNC alternatively can be based on one of many other formulations known and used in the art. LNC formulations can include, but are not limited to, zeolite and alumina ($Al_2O_3$) base containing any of a number of transition state metals, such as $Al_2O_3$, $Sn/\gamma-Al_2O_3$, Co-ZSM-5, Cu—$ZrO_2$, $Co/Al_2O_3$, Cu-ZSM-5, and Ga-ZSM-5. Use of alumina in and of itself can act as a catalyst for the reduction of NOx. The appropriate operating temperature range of the LNC is strongly dependent on its composition, from about 200° C. up to about 600° C. For example, Pt—$Al_2O_3$ is most active in the range of 175° C.–400° C., while Cu-ZSM-5 is most active in the range of 375° C.–450° C., and $\gamma-Al_2O_3$ is most active in the range of 450° C.–600° C.

The LNC 24 preferably has a monolithic structure. However, pellets of different shapes, ceramic foams, and metal foams are other possible structures for the LNC. The LNC can use either a ceramic or metal monolithic substrate, with cell density and wall thickness optimized to achieve the highest destruction rates and the lowest pressure drops for a specific application. Both metal and ceramic substrates are commercially available in numerous cell densities and wall thicknesses. In alternative embodiments, the LNC is deposited upstream of the DPF 22, along the exchanger walls 14 and 16 in the inlet passage 18. Alternatively, the LNC can be made integral to the DPF by coating the DPF itself with the LNC on the end of the DPF facing the inlet passage.

Another embodiment of the invention includes a DPF 22 and DOC 36 with no LNC 24. In this embodiment, the apparatus 10 serves as a particulate filter or trap. The advantage of this embodiment is the ability to maintain a higher temperature within the core of the apparatus, because there is no need to operate at the lower temperatures required by the LNC. This higher temperature enhances the chemical conversion rates across the DPF and DOC.

Another embodiment of the invention includes a DOC 36 and a LNC 24 with no DPF 22. This embodiment retains the advantage of being able to place the DOC and LNC adjacent to each other because of their similar operating temperatures. This embodiment can be effectively used when the fluid stream to be treated contains a low level of PM.

The preferred embodiment of the invention also includes a fuel injector 32, shown in FIG. 1, to provide additional heat energy to the fluid stream entering the DPF 22, as well as supplementary HC for reaction with NOx from the fluid stream at the LNC 24. Analysis has shown that the amount of HC required as a reducing agent for the LNC is comparable to the amount required to elevate the DPF to its proper operating temperature. If the stream is an engine exhaust, the fuel injector is placed upstream of the inlet plenum 26 to ensure proper mixing of HC into the stream, and it is cycled for safety and reliability using a pulse-width modulation technique. The fuel injector is used to maintain the operating temperature of the combined catalyst system in the proper operating range, and to provide for periodic regeneration of the DPF, as discussed below.

In this embodiment, the apparatus 10 also contains various pressure, engine speed (if the stream is an engine exhaust) and temperature sensors to regulate the injection of fuel. Alternative embodiments of the apparatus lack a fuel injector, if such HC injection is not required for the service in which the apparatus operates (i.e., if the temperature is sufficiently high for proper catalyst operation, or if sufficient HC is present in the exhaust stream for LNC 24 reaction). Additionally, an electrical resistance heater 30 may be placed between the inlet passage 18 and the DPF 22, to provide additional heat for optimum operation of the DPF.

The synergism between the different components optimizes the individual performance of the three technologies, providing superior emissions reduction results. The unique configuration of a NOx reduction function, an oxidation function, and a heat recovery function offers several synergistic advantages. First, the LNC 24 used to reduce NOx requires the presence of additional hydrocarbon in the system. Typically, excess HC must be added to achieve maximum NOx reduction. By placing an oxidation catalyst or a catalyzed DPF 22 downstream of the LNC, unreacted HC is oxidized, eliminating emission of HC and CO, and producing heat. This heat raises the temperature of the DPF, facilitating regeneration by oxidizing the carbonaceous PM trapped in the filter. The heat generated by the exothermic oxidation of HC, CO, and PM is recycled by the heat exchanger, thereby preheating the cooler engine exhaust stream entering the system. The recycling of heat facilitates both the reduction of NOx with the LNC and the regeneration of the DPF by increasing the temperatures of these components and the exhaust gases flowing over them.

Finally, the active fuel injection and control system allows further optimization of the system. A number of control strategies can be invoked, depending on the desired performance. For maximum NOx reduction, fuel should be injected continuously, to maintain an optimum temperature and to supply HC as a reductant to the LNC 24. Alternatively, fuel consumption can be substantially reduced if the fuel is injected only periodically to elevate the DPF 22 temperature for regeneration. A further important function of the fuel injection system is the ability to periodically add sufficient fuel to raise the catalyst temperature above 600° C., or so that all the excess oxygen in the exhaust is consumed. This periodic high temperature/rich cycling can partially reverse sulfur poisoning of the catalysts on the LNC and DPF.

As Table 1 indicates, a ZSM-5 based LNC 24 and a catalyzed DPF 22 will both operate well within the temperature range of 375° C. to 450° C., and can therefore be combined in proximity to achieve simultaneous CO, HC, NOx, and PM reduction. The preferred selection of the LNC and DPF formulations is dependent upon engine size and duty cycle, and upon the sulfur content of the fuel. For a small, light duty engine using low-sulfur fuel, the preferred selections are a Pt-$\gamma$-$Al_2O_3$ LNC, and a Pt-impregnated cordierite DPF. For heavy duty engines (i.e., 12-liter displacement, heavy-duty cycle), the preferred selections are a $\gamma$-$Al_2O_3$ LNC (i.e., with no precious metal), and a Pt-impregnated DPF. The DPF, DOC 36 and LNC are placed serially adjacent between the inlet passage 18 and outlet passage 20, making it easy to keep all of the catalysts operating at their optimum temperatures.

TABLE 1

| | PM Oxidation Temperatures | | LNC Preferred Temperatures |
|---|---|---|---|
| Without catalyst: | 550° C.–600° C. | Al₂O₃ based: | 450° C.–600° C. |
| With catalyst: | 375° C.–450° C. | ZSM-5 based: | 375° C.–450° C. |
| With fuel addition: | 275° C.–350° C. | Pt-based low-temp: | 175° C.–400° C. |

Figure 2:
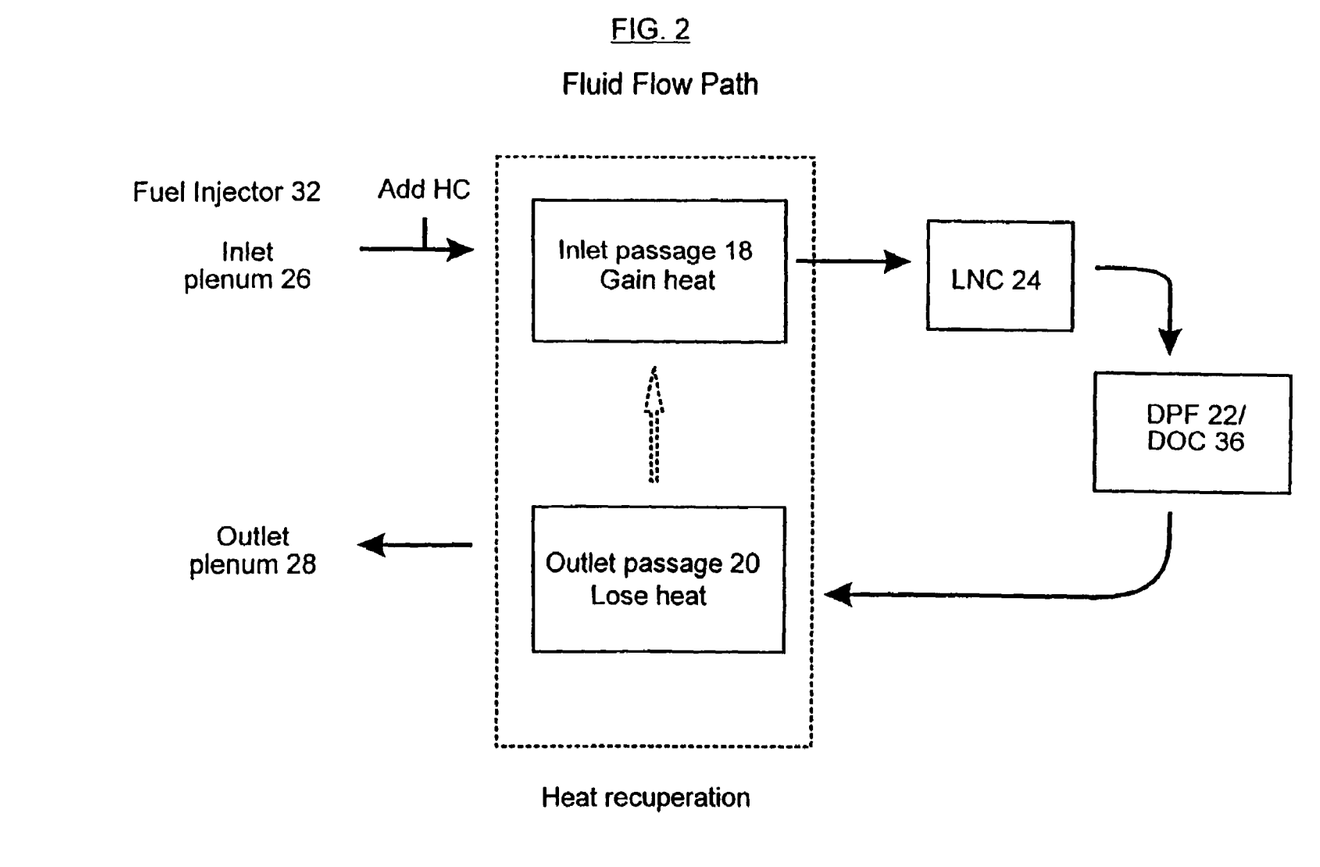
FIG. 2 is a flow diagram that shows the relative positions of the individual components within the apparatus of FIG. 1, and fluid stream flow through the apparatus.

FIG. 2 is a flow diagram illustrating operation of the apparatus to treat engine exhaust. On start-up of the engine, and once the catalyst has warmed up to its light-off temperature (approximately 200° C.), supplemental HC is introduced through the fuel injector 32 into the exhaust stream. The supplemental HC is reacted exothermically at the DPF 22 in order to bring the apparatus 10 to the proper operating temperature. After initial start-up, heat from the treated gas in the outlet passage 20 provides most of the added heat necessary to bring the engine exhaust gases to the proper temperature. This is because the exothermic nature of the emissions-reducing reactions across the DPF 22 within the apparatus produce enough heat to ensure the proper preheating of the engine exhaust gases, with minimal input of supplemental HC. The amount of energy required to elevate the exhaust temperature to the appropriate range is significantly reduced, because of the heat recovery afforded by heat exchange between the inner and outer passages.

Once the stream has been pre-heated sufficiently, reaction begins at the LNC 24, where the NOx reacts with HC that has been introduced into the stream via the fuel injector 32. Analysis shows that the amount of HC required as a reducing agent for the LNC is comparable to the amount of HC required to bring the DPF 22 to its proper operating temperature. This elevation is preferably accomplished with the fuel injector, by using a pulse-width modulation technique whereby different amounts of HC are introduced upstream of the apparatus, based on a control algorithm that maintains the LNC and DPF at their proper temperature setpoints. This will increase the temperature at the DPF past the light-off temperature, thereby causing PM to be oxidized and the DPF to be regenerated. After passing through the DPF, the treated stream passes through the outlet passage 20 to the outlet plenum 28. This fuel injection can be continuous or intermittent, depending upon the composition of the exhaust stream and the resulting rate of accumulation of PM.

Because of the relatively low operating temperature of lean-burn engines, the DPF 22 needs to enhance low-temperature PM removal in this service, to avoid plugging under operating conditions of extended idle. To prevent pressure drop due to plugging from becoming excessive, the DPF must be regenerated by heat released by catalytic oxidation. Because the dry carbon particles of the PM require a temperature of at least 400° C. to 450° C. for ignition, additional heat energy may be required in the form of fuel from the fuel injector 32 or electricity from the heating element 30 to bring the DPF up to the appropriate temperature for PM destruction should HC in the entering emission stream be insufficient. To do this, pressure sensors 34 measure pressure drop across the DPF, producing a pressure signal that is input into a controller. If this pressure drop becomes excessive, the controller controls the fuel injector 32 to provide increased HC to raise the temperature to the ignition temperature of the PM. Once pressure drop has fallen to acceptable levels, the controller ends additional HC injection. Also, a temperature sensor 38 measures temperature near the DPF, producing a temperature signal that is input into the controller. If the temperature falls below the optimum operating temperature of the DPF, the controller controls the fuel injector to provide increased HC to elevate the temperature near the DPF.

Engines are tested at different load points to facilitate performance characterization. An example of a load point is 1200 rpm and 500 ft-lbs of torque. Engine idle is the most energy-efficient load point for regeneration of the DPF 22, because less exhaust gas needs to be heated to the light-off temperature. However, temperatures are too low at idle to begin regeneration, and heat released during regeneration (40° C. to 100° C.) is not great enough to sustain the reaction chemistry.

Figure 3:
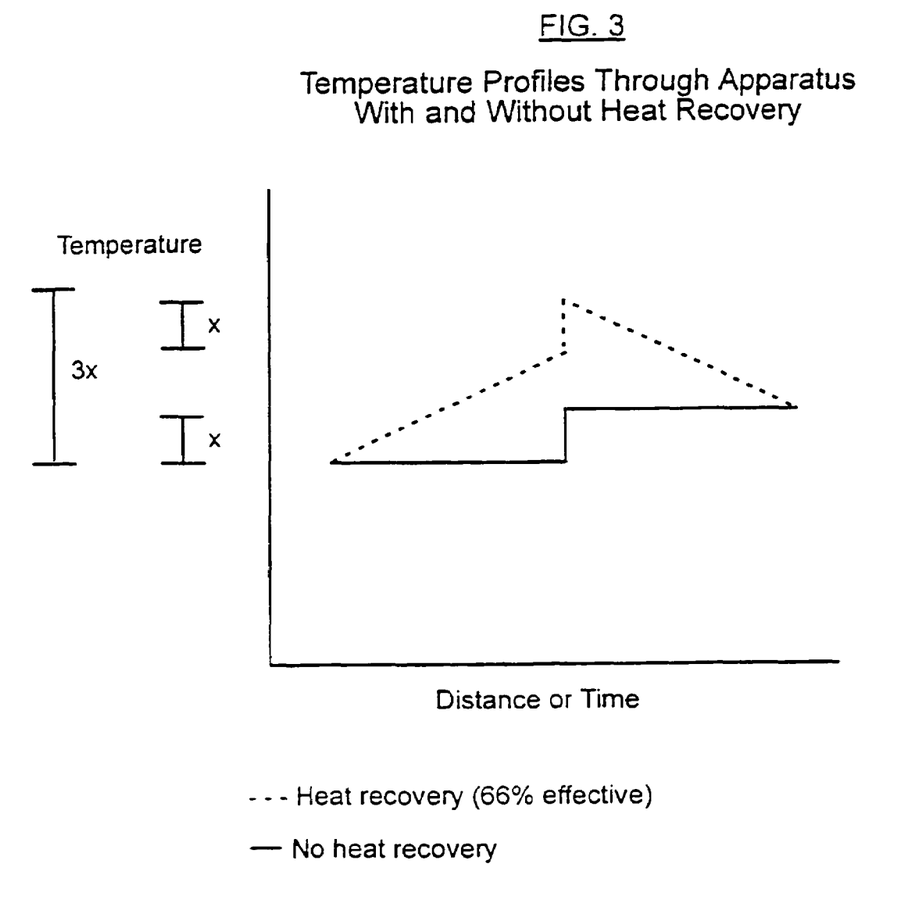
FIG. 3 is a graph depicting the temperature rise of a catalyzed diesel particulate filter and/or a diesel oxidation catalyst in an apparatus that lacks a heat exchanger for heat recovery, and an apparatus with a heat exchanger that is 66% effective.
Figure 4:
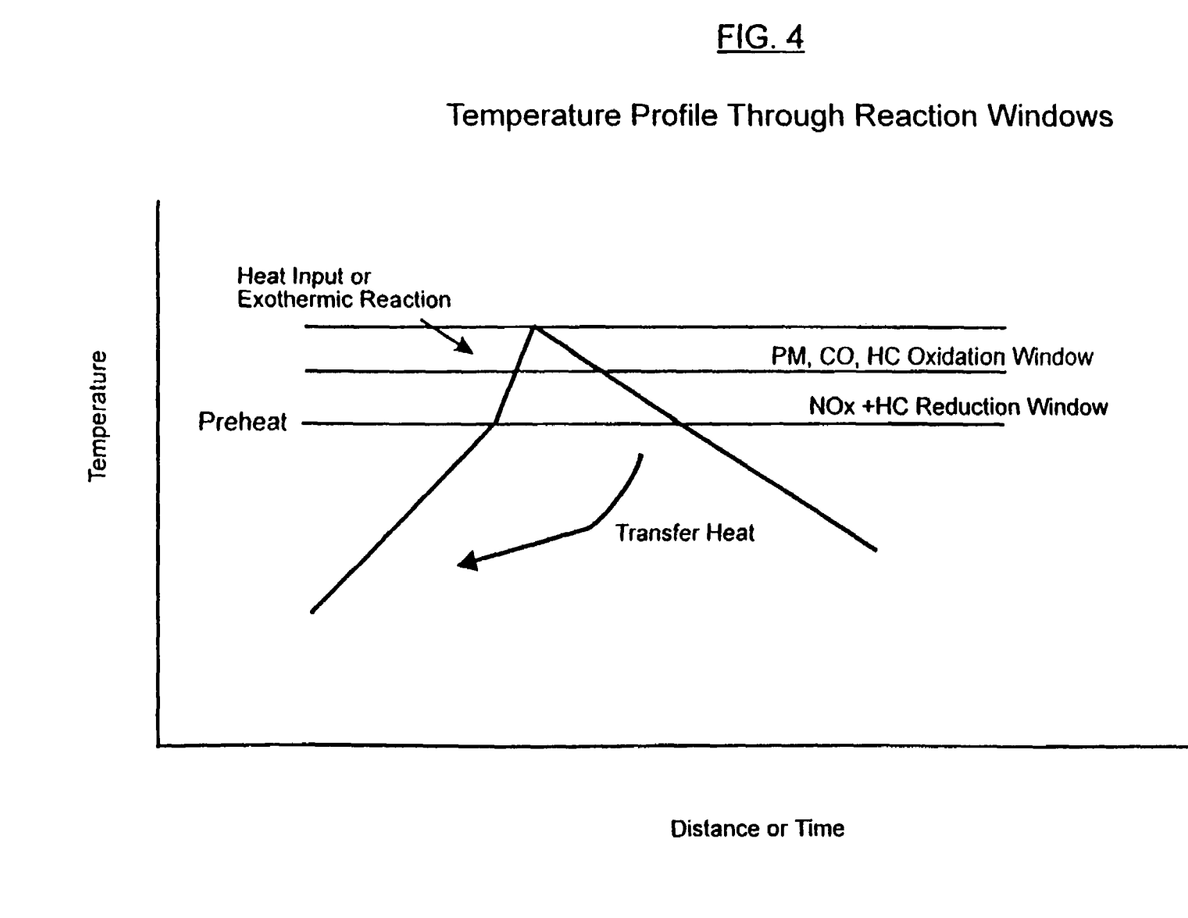
FIG. 4 is a graph of the temperature rise through the apparatus of FIG. 1, including heat input from reduction of NOx and oxidation of particulate matter and carbon monoxide.

The temperature rise across a regenerated DPF 22 is up to 40° C. Heat exchange between the inlet passage 18 and outlet passage 20 leverages this temperature rise. FIGS. 3 and 4 illustrate the effect of this heat recovery. FIG. 3 shows the temperature profile of an apparatus comprising a DPF and/or DOC 36, but lacking a heat exchanger, and also shows the temperature profile of an apparatus with DPF and/or DOC and a heat exchanger with 66% efficiency. FIG. 4 shows the temperature profile of an apparatus with a DPF and/or DOC and LNC, as well as a heat exchanger. The figures illustrate the increase in temperature in the fluid stream due to heat exchange between the inlet and outlet passage.

A higher system temperature leads to energy efficient, well-controlled filter regeneration. However, temperatures are too low at idle to begin regeneration, and heat released during regeneration is insufficient to sustain the reaction chemistry. During operation, flow passes through the inlet plenum 26 into the inlet passage 18. In the inlet passage, the fluid stream is heated by thermal exchange with the hotter gas in the outlet passage 20. The heat exchange between the inlet and outlet passages increases the temperature of the fluid stream beyond the rise from the heat released by the catalyzed reactions, to the optimum temperatures at which the catalyst in the DPF 22 and the LNC 24 operate. This heat exchange leverages the temperature rise, as shown in Table 2. The effectiveness of a heat exchanger is defined as:

$$(\eta(\%)=1-(\Delta T_{reaction}/\Delta T_{system}).$$

TABLE 2

| Heat Exchanger Effectiveness, η (%) | $\Delta T_{reaction}$ | $\Delta T_{system}$ |
|---|---|---|
| 0 | 40 | 40 |
| 50 | 40 | 80 |
| 66 | 40 | 120 |
| 80 | 40 | 200 |
| 90 | 40 | 400 |

If used to treat engine exhaust streams, the apparatus 10 is configured to have a catalyst volume from half to three times the displacement of the engine; i.e., a 12-liter engine will require a 6-liter to 36-liter volume to contain its LNC 24, DPF 22 and DOC 38.

Although the invention has been disclosed in detail with reference only to the preferred embodiments, those skilled in the art will appreciate that alternative embodiments of the apparatus can be constructed without departing from the scope of the invention. Accordingly, the invention is defined only by the following claims.

I claim:

1. An apparatus for processing a fluid stream, comprising:
a heat exchanger having first and second spaced-apart walls that define an inlet passage and an outlet passage for the fluid stream, wherein the walls are configured to transfer heat from the outlet passage to the inlet passage;

a diesel particulate filter integrally connected to the heat exchanger and positioned to transmit the fluid stream from the inlet passage to the outlet passage, wherein the diesel particulate filter is configured to oxidize carbon monoxide and hydrocarbons, and to collect and oxidize particulate matter present in the fluid stream;

a fuel injector located and configured to inject hydrocarbons into the inlet passage;

one or more pressure sensors configured to produce a pressure signal indicative of any pressure drop through the diesel particulate filter;

a temperature sensor configured to produce a temperature signal, indicative of the temperature at a predetermined position adjacent to the diesel particulate filter; and a controller, responsive to the pressure signal and the temperature signal, for controlling the rate at which the fuel injector injects hydrocarbons into the inlet passage.

2. The apparatus of claim 1, wherein the diesel particulate filter is a ceramic wall-flow particulate filter.

3. The apparatus of claim 1, wherein the diesel particulate filter comprises a material selected from the group consisting of ceramic foam, sintered metal foam, and ceramic fiber yarn.

4. The apparatus of claim 1, wherein the controller is selected to maintain the pressure drop through the diesel particulate filter at or below a specified level.

5. The apparatus of claim 1, wherein the controller is selected to maintain the temperature at a predetermined position adjacent to the diesel particulate filter at or below a specified level.

6. The apparatus of claim 1, wherein:
the fluid stream is the exhaust from an engine;
the engine comprises an engine speed sensor configured to produce an engine speed signal indicative of the engine's speed; and
the controller is responsive to the engine speed signal for controlling the rate at which the fuel injector injects hydrocarbons into the inlet passage.

7. The apparatus of claim 1, and further comprising a resistance heater configured to heat the fluid stream in the inlet passage.

8. The apparatus of claim 1, wherein the first and second spaced-apart walls have a spiral configuration.

9. The apparatus of claim 1, wherein the diesel particulate filter comprises a catalyst.

10. The apparatus of claim 9, wherein the catalyst comprises a material selected from the group of platinum, palladium, and ceramic oxide.

11. The apparatus of claim 1, and further comprising a diesel oxidation catalyst integrally connected to the heat exchanger, between the inlet and outlet passage, wherein the diesel oxidation catalyst is configured to oxidize carbon monoxide and hydrocarbons present in the fluid stream.

12. The apparatus of claim 11, wherein the diesel oxidation catalyst comprises metal.

13. The apparatus of claim 11, wherein the diesel oxidation catalyst comprises ceramic foam or metal foam.

14. The apparatus of claim 1, and further comprising a lean-NOx catalyst located upstream of the diesel particulate filter, wherein the lean-NOx catalyst is configured to reduce nitrogen oxides present in the fluid stream.

15. The apparatus of claim 14, wherein the lean-NOx catalyst has a monolithic structure.

16. The apparatus of claim 14, wherein the lean-NOx catalyst is comprised of a material selected from the group consisting of precious metal, ceramic foam, and metal foam.

17. The apparatus of claim 14, wherein the lean-NOx catalyst is located immediately adjacent to the diesel particulate filter.

18. The apparatus of claim 17, wherein:
the diesel particulate filter has a surface facing the inlet passage; and
wherein the lean-NOx catalyst is deposited on the surface of the diesel particulate filter facing the inlet passage.

19. An apparatus for processing a fluid stream, comprising:
a heat exchanger having first and second spaced-apart walls that define an inlet passage and an outlet passage for the fluid stream, wherein the walls are configured to transfer heat from the outlet passage to the inlet passage;

a diesel oxidation catalyst integrally connected to the heat exchanger, between the inlet and outlet passage, wherein the diesel oxidation catalyst is configured to oxidize carbon monoxide and hydrocarbons in the fluid stream;

a lean-NOx catalyst located upstream of the diesel oxidation catalyst, wherein the lean-NOx catalyst is configured to reduce nitrogen oxides in the stream;

a fuel injector located and configured to inject hydrocarbons into the inlet passage;

a temperature sensor configured to produce a temperature signal, indicative of the temperature a predetermined position adjacent to the diesel oxidation catalyst; and a controller, responsive to the temperature signal, for controlling the rate at which the fuel injector injects hydrocarbons into the inlet passage;

wherein:
the fluid stream is the exhaust from an engine;
the engine comprises an engine speed sensor configured to produce an engine speed signal indicative of the engine's speed; and
the controller is responsive to the engine speed signal for controlling the rate at which the fuel injector injects hydrocarbons into the inlet passage.

20. The apparatus of claim 19, wherein the diesel oxidation catalyst comprises metal.

21. The apparatus of claim 19, wherein the diesel oxidation catalyst comprises ceramic foam or metal foam.

22. The apparatus of claim 19, wherein the lean-NOx catalyst is located immediately adjacent to the diesel oxidation catalyst.

23. The apparatus of claim 22, wherein:
the diesel oxidation catalyst has a surface facing the inlet passage; and
wherein the lean-NOx catalyst is deposited on the surface of the diesel oxidation catalyst facing the inlet passage.

24. The apparatus of claim 19, wherein the lean-NOx catalyst has a monolithic structure.

25. The apparatus of claim 19, wherein the lean-NOx catalyst is comprised of a metal selected from the group consisting of precious metal, ceramic foam, and metal foam.

26. The apparatus of claim 19, wherein the controller is selected to maintain the temperature at a predetermined position adjacent to the diesel oxidation catalyst at or below a specified level.

27. The apparatus of claim 19, and further comprising a resistance heater configured to heat the fluid stream in the inlet passage.

28. The apparatus of claim 19, wherein the first and second spaced-apart walls have a spiral configuration.

29. Apparatus for processing a fluid stream, comprising:
a heat exchanger having first and second spaced-apart walls that define an inlet passage and an outlet passage for the fluid stream, wherein the walls are configured to transfer heats from the outlet passage to the inlet passage;
a diesel particulate filter integrally connected to the heat exchanger and positioned to transmit the fluid stream from the inlet passage to the outlet passage, wherein the diesel particulate filter is configured to oxidize carbon monoxide and hydrocarbons, and to collect and oxidize particulate matter present in the fluid stream;
a diesel oxidation catalyst integrally connected to the heat exchanger, between the inlet and outlet passage, wherein the diesel oxidation catalyst is configured to oxidize carbon monoxide and hydrocarbons present in the fluid stream;
a lean-NOx catalyst located upstream of the diesel particulate filter, wherein the lean-NOx catalyst is configured to reduce nitrogen oxides present in the fluid stream;
a fuel injector located and configured to inject hydrocarbons into the inlet passage;
one or more pressure sensors configured to produce a pressure signal indicative of any pressure drop through the diesel particulate filter;
a temperature sensor configured to produce a temperature signal, indicative of the temperature at a predetermined position adjacent to the diesel particulate filter;
a controller, responsive to the pressure signal and the temperature signal, for controlling the rate at which the fuel injector injects hydrocarbons into the inlet passage;
wherein the controller is selected to maintain the pressure drop through the diesel particulate filter at or below a specified level, and to maintain the temperature at a predetermined position within the diesel particulate filter at or below a specified level; and
a resistance heater configured to heat the fluid stream in the inlet passage.

30. The apparatus of claim 29, wherein:
the fluid stream is the exhaust from an engine;
the engine comprises an engine speed sensor configured to produce an engine speed signal indicative of the engine's speed; and
the controller is responsive to the engine speed signal for controlling the rate at which the fuel injector injects hydrocarbons into the inlet passage.

31. A method for processing a fluid stream, comprising:
preheating the fluid stream by heat exchange using an exiting treated fluid stream;
oxidizing carbon monoxide and hydrocarbons, and collecting and oxidizing particulate matter in the preheated fluid stream, to produce the exiting treated fluid stream; and
injecting hydrocarbon into the preheated fluid stream;
wherein injecting hydrocarbon into the preheated fluid stream comprises:
measuring the temperature at a point in the preheated fluid stream; and
controlling the rate at which hydrocarbon is injected into the preheated fluid stream based upon the measured temperature.

32. The method of claim 31, wherein oxidizing carbon monoxide and hydrocarbons, and collecting and oxidizing particulate matter present in the preheated fluid stream is performed using a diesel particulate filter.

33. The method of claim 31, wherein oxidizing carbon monoxide and hydrocarbons present in the preheated fluid stream is performed using a diesel oxidation catalyst.

34. The method of claim 31, and further comprising reducing nitrogen oxides present in the preheated fluid stream.

35. The method of claim 34, wherein reducing nitrogen oxides present in the preheated fluid stream is performed using a lean-NOx catalyst.

36. The method of claim 31, wherein injecting hydrocarbon into the preheated fluid stream comprises:
measuring the pressure at points in the preheated fluid stream; and
controlling the rate at which hydrocarbon is injected into the preheated fluid stream based upon the measured pressures.

37. The method of claim 31, wherein the preheated fluid stream is the exhaust from an engine, and further comprising:
measuring the speed of the engine; and
controlling the rate at which hydrocarbon is injected into the preheated fluid stream based upon the measured engine speed.

38. The method of claim 31, and further comprising preheating the fluid stream using an external heat source prior to preheating using the exiting treated fluid stream.

39. A method for processing a fluid stream, comprising:
preheating the fluid stream by heat exchange using an exiting treated fluid stream;
oxidizing carbon monoxide and hydrocarbons, and reducing nitrogen oxides present in the preheated fluid stream, to produce the exiting treated fluid stream; and
injecting hydrocarbon into the preheated fluid stream;
wherein injecting hydrocarbon into the preheated fluid stream comprises:
measuring the temperature at a point in the preheated fluid stream; and
controlling the rate at which hydrocarbon is injected into the preheated fluid stream based upon the measured temperature.

40. The method of claim 39, wherein oxidizing carbon monoxide and hydrocarbons present in the preheated fluid stream is performed using a diesel oxidation catalyst.

41. The method of claim 39, wherein reducing nitrogen oxides present in the preheated fluid stream is performed using a lean-NOx catalyst.

42. The method of claim 39, wherein the preheated fluid stream is the exhaust from an engine, and further comprising:
measuring the speed of the engine; and
controlling the rate at which hydrocarbon is injected into the preheated fluid stream based upon the measured engine speed.

43. The method of claim 39, and further comprising preheating the fluid stream using an external heat source prior to preheating using the exiting treated fluid stream.

44. A method for processing a fluid stream, comprising:
preheating the fluid stream using an external heat source;
further preheating the fluid stream by heat exchange using an exiting treated fluid stream;
measuring the temperature at a point in the preheated fluid stream;
measuring the pressure at points in the preheated fluid stream;
injecting hydrocarbon into the preheated fluid stream;

controlling the rate at which hydrocarbon is injected into the preheated fluid stream based upon the measured temperature and pressures;

reducing nitrogen oxides in the preheated fluid stream; and oxidizing carbon monoxide and hydrocarbons, and collecting and oxidizing particulate matter in the preheated fluid stream to produce the exiting treated fluid stream.

45. The method of claim 44, wherein the preheated fluid stream is the exhaust from an engine, and further comprising measuring the speed of the engine and controlling the rate at which hydrocarbon is injected into the preheated fluid stream based upon the measured engine speed.

* * * * *